US010784987B2

(12) United States Patent
Marinier et al.

(10) Patent No.: US 10,784,987 B2
(45) Date of Patent: Sep. 22, 2020

(54) METHODS FOR ENHANCED MULTIPLEXING IN WIRELESS SYSTEMS

(71) Applicant: IDAC HOLDINGS, INC., Wilmington, DE (US)

(72) Inventors: Paul Marinier, Brossard (CA); Ghyslain Pelletier, Montreal (CA); Benoit Pelletier, Roxboro (CA)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/761,622

(22) PCT Filed: Sep. 26, 2016

(86) PCT No.: PCT/US2016/053730
§ 371 (c)(1),
(2) Date: Mar. 20, 2018

(87) PCT Pub. No.: WO2017/053948
PCT Pub. Date: Mar. 30, 2017

(65) Prior Publication Data
US 2019/0068318 A1  Feb. 28, 2019

Related U.S. Application Data

(60) Provisional application No. 62/273,969, filed on Dec. 31, 2015, provisional application No. 62/232,022, filed on Sep. 24, 2015.

(51) Int. Cl.
*H04L 1/18* (2006.01)
*H04L 1/00* (2006.01)

(52) U.S. Cl.
CPC .......... *H04L 1/0041* (2013.01); *H04L 1/004* (2013.01); *H04L 1/0045* (2013.01);
(Continued)

(58) Field of Classification Search
CPC ... H04L 1/0041; H04L 1/0045; H04L 1/0061; H04L 1/1812
See application file for complete search history.

(56) References Cited

U.S. PATENT DOCUMENTS 5,477,533 A * 12/1995 Tsurumaki ............ H04J 3/1682
370/294
5,594,732 A *  1/1997 Bell ...................... H04L 12/413
370/401
(Continued)

FOREIGN PATENT DOCUMENTS

CN    103326756 A    9/2013
CN    103973402      8/2014
(Continued)

OTHER PUBLICATIONS

Harkins, "Secure Password Ciphersuites for Transport Layer Security (TLS)," Transport Layer Security Internet-Draft (Aug. 5, 2016).
(Continued)

*Primary Examiner* — Esaw T Abraham
(74) *Attorney, Agent, or Firm* — Volpe and Koenig, P.C.

(57) ABSTRACT

Methods and systems for operation in a wireless communication system are provided. A first transmission may be initiated using at least a first portion of physical layer resources. A second transmission may be initiated using at least a second portion of the same physical layer resources. The first transmission may be any one of a puncturing transmission, interfering transmission, delay-sensitive transmission, or short transmission. The second transmission may be an on-going transmission or a long transmission.

10 Claims, 9 Drawing Sheets

(52) U.S. Cl.
CPC .......... *H04L 1/0061* (2013.01); *H04L 1/0065* (2013.01); *H04L 1/1812* (2013.01); *H04L 1/1845* (2013.01); *H04L 1/1896* (2013.01); *H04L 1/1819* (2013.01)

(56) References Cited

U.S. PATENT DOCUMENTS

| | | | | |
|---|---|---|---|---|
| 5,764,699 | A * | 6/1998 | Needham | H04L 1/0003 375/261 |
| 6,208,663 | B1 * | 3/2001 | Schramm | H04L 1/0006 370/465 |
| 6,823,005 | B1 * | 11/2004 | Chuang | H04L 1/0003 375/227 |
| 6,865,233 | B1 * | 3/2005 | Eriksson | H04L 1/0003 375/261 |
| 7,289,574 | B2 * | 10/2007 | Parolari | H04L 1/0003 375/259 |
| 8,667,357 | B2 | 3/2014 | Park | |
| 8,839,078 | B2 | 9/2014 | Abu-Surra et al. | |
| 8,984,362 | B2 * | 3/2015 | Lee | H04L 1/1607 714/746 |
| 9,672,110 | B1 * | 6/2017 | Patel | G06F 11/1092 |
| 2009/0077456 | A1 | 3/2009 | Pi et al. | |
| 2009/0313516 | A1 * | 12/2009 | Shin | H04L 1/0003 714/748 |
| 2011/0126068 | A1 * | 5/2011 | Lee | H04L 1/1607 714/748 |
| 2015/0334712 | A1 | 11/2015 | Maaref et al. | |
| 2016/0036578 | A1 | 2/2016 | Malladi et al. | |
| 2017/0207895 | A1 | 7/2017 | Yang et al. | |

FOREIGN PATENT DOCUMENTS

| | | |
|---|---|---|
| CN | 104135345 | 11/2014 |
| EP | 1571773 B1 | 9/2015 |
| EP | 1971096 B1 | 1/2019 |
| WO | 2010050688 A2 | 5/2010 |

OTHER PUBLICATIONS

Interdigital Communications, "Efficient multiplexing of traffic for different use cases," 3GPP TSG-RAN WG1 Meeting #86, R1-167331, Gothenburg, Sweden (Aug. 22-26, 2016).

Interdigital Communications, "Outer erasure code for efficient multiplexing," 3GPP TSG-RAN WG1 #85, R1-164667, Nanjing, China (May 23-27, 2016).

Mann et al., "Performance of Rateless Codes Using OFDM System Over Wireless Broadcast," International Journal of Engineering Sciences and Research Technology, pp. 432-437 (Sep. 2015).

Qualcomm et al., "WF on Outer Code," 3GPP TSG RAN WG1 #84bis meeting, R1-163793, Busan, Korea (Apr. 11-15, 2016).

Qualcomm, "5G Views on Technology and Standardization," 3GPP RAN Workshop, RWS-150012, Phoenix, US (Sep. 2015).

Third Generation Partnership Project, "Technical Specification Group Radio Access Network; Evolved Universal Terrestrial Radio Access (E-UTRA); Multiplexing and channel coding (Release 12)," 3GPP TS 36.212 V12.5.0 (Jun. 2015).

Third Generation Partnership Project, "Technical Specification Group Radio Access Network; Evolved Universal Terrestrial Radio Access (E-UTRA); Multiplexing and channel coding (Release 12)," 3GPP TS 36.212 V12.8.0 (Mar. 2016).

Third Generation Partnership Project, "Technical Specification Group Radio Access Network; Evolved Universal Terrestrial Radio Access (E-UTRA); Multiplexing and channel coding (Release 13)," 3GPP TS 36.212 V13.2.0 (Jun. 2016).

Third Generation Partnership Project, "Technical Specification Group Radio Access Network; Evolved Universal Terrestrial Radio Access (E-UTRA); Physical layer procedures (Release 12)," 3GPP TS 36.213 V12.6.0 (Jun. 2015).

Third Generation Partnership Project, Technical Specification Group Radio Access Network; Evolved Universal Terrestrial Radio Access (E-UTRA); Physical layer procedures (Release 12)3GPP TS 36.213 V12.10.0 (Jun. 2016).

Third Generation Partnership Project, "Technical Specification Group Radio Access Network; Evolved Universal Terrestrial Radio Access (E-UTRA); Physical layer procedures (Release 13)," 3GPP TS 36.213 V13.2.0 (Jun. 2016).

Third Generation Partnership Project, "Technical Specification Group Radio Access Network; Evolved Universal Terrestrial Radio Access (E-UTRA); Physical layer; Measurements (Release 12)," 3GPP TS 36.214 V12.2.0 (Mar. 2015).

Third Generation Partnership Project, "Technical Specification Group Radio Access Network; Evolved Universal Terrestrial Radio Access (E-UTRA); Physical layer; Measurements (Release 13)," 3GPP TS 36.214 V13.2.0 (Jun. 2016).

* cited by examiner

HARQ applicable on transport block basis

HARQ applicable on code block basis

METHODS FOR ENHANCED MULTIPLEXING IN WIRELESS SYSTEMS

CROSS REFERENCE TO RELATED APPLICATIONS

This application is the U.S. National Stage, under 35 U.S.C. § 371, of International Application No. PCT/US2016/053730 filed Sep. 26, 2016, which claims the benefit of U.S. Provisional Applications 62/232,022 filed Sep. 24, 2015 and 62/273,969 filed Dec. 31, 2015, the content of which are hereby incorporated by reference herein.

BACKGROUND

Over the years there have been a number of advancements in the methods, apparatuses, and systems used to address problems that arise in the world of wireless communication. Mobile communication progressively advances in generations of wireless communications to address new, and improve old, uses as industry demands. For example, fifth generation (5G) technologies may attempt to address problems relating to improved broadband performance (IBB), industrial control and communications (ICC) and vehicular applications (V2X), and massive Machine-Type Communications (mMTC). These areas have requirements that relate to ultra-low transmission latency, ultra-reliable transmission, MTC operation, and a plurality of spectrum operating modes (SOMs). Therefore, 5G and other generations of wireless communication technology may efficiently support the transmission of data with different requirements in terms of latency, throughput, and reliability.

SUMMARY

Methods and systems for performing wireless communications may involve initiating a first transmission, wherein the first transmission may be performed using at least a first portion of physical layer resources; and initiating a second transmission, wherein the second transmission may be performed using at least a second portion of the physical layer resources, wherein the first portion of physical layer resources overlaps with the second portion of physical resources. Additionally, methods and systems for signal transmission below a mac layer may include attaching a cyclic redundancy check (CRC) to a data block of a plurality of bits, segmenting one or more source symbols of the plurality of bits, performing first stage encoding of the symbols, concatenating the encoded symbols and/or code block information attachment, performing second stage encoding of one or more code blocks, multiplexing coded blocks from the second stage encoding, performing physical channel processing, and transmitting a signal.

BRIEF DESCRIPTION OF THE DRAWINGS

A more detailed understanding may be had from the following description, given by way of example in conjunction with the accompanying drawings wherein.

DETAILED DESCRIPTION

Figure 1A:
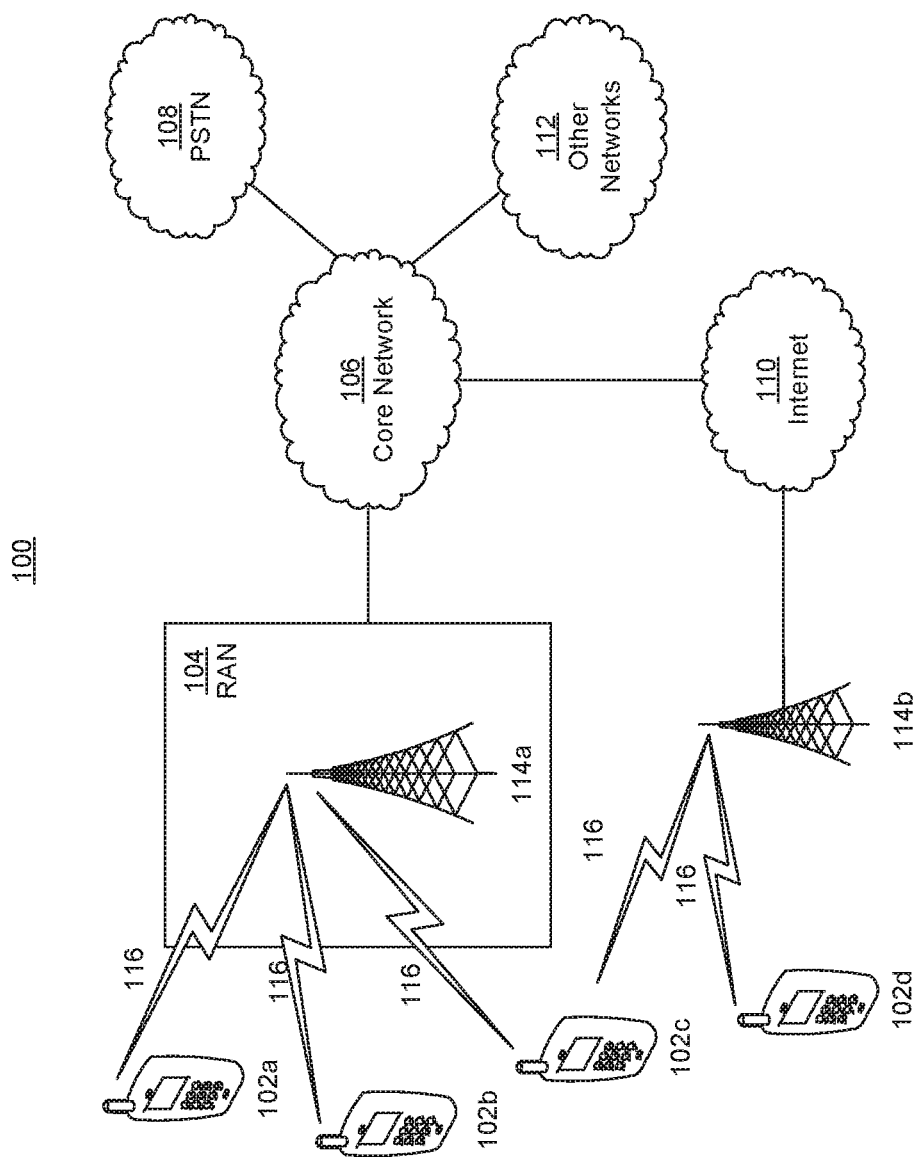
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a tablet, a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In another embodiment, the base station 114a and the WTRUs 102a, 102b, 102c may implement a radio technology such as 5G radio access technologies, which may establish the air interface 116 using New Radio (NR) technologies.

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
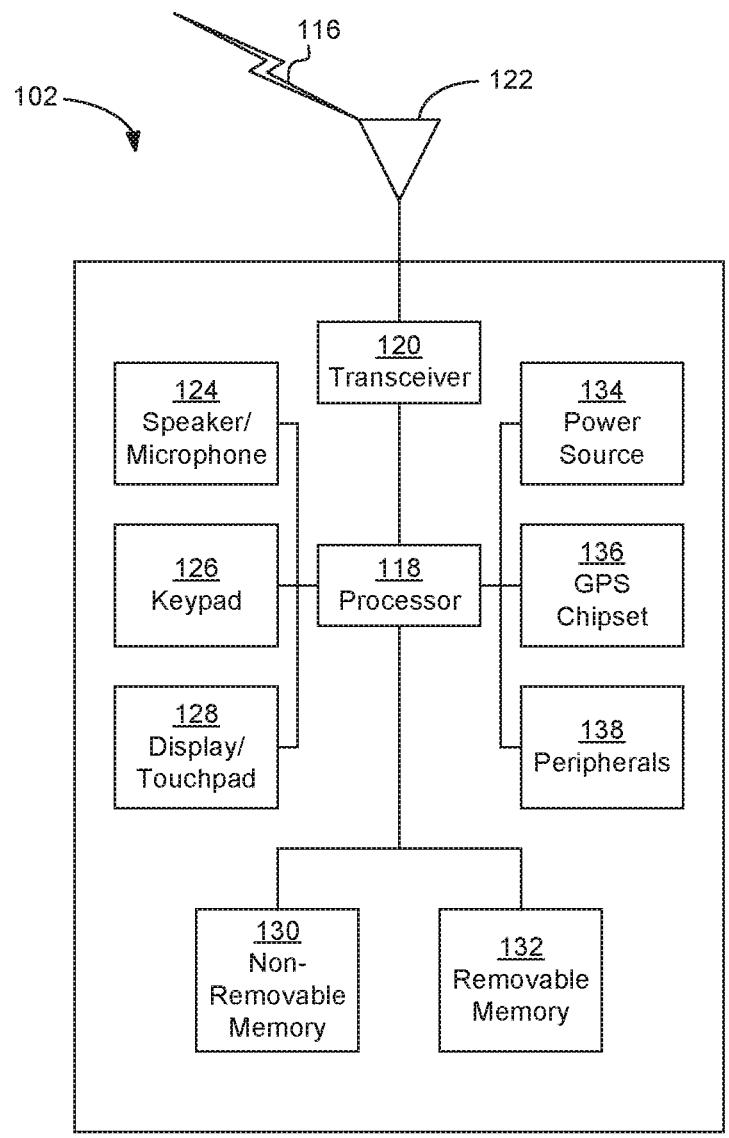
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
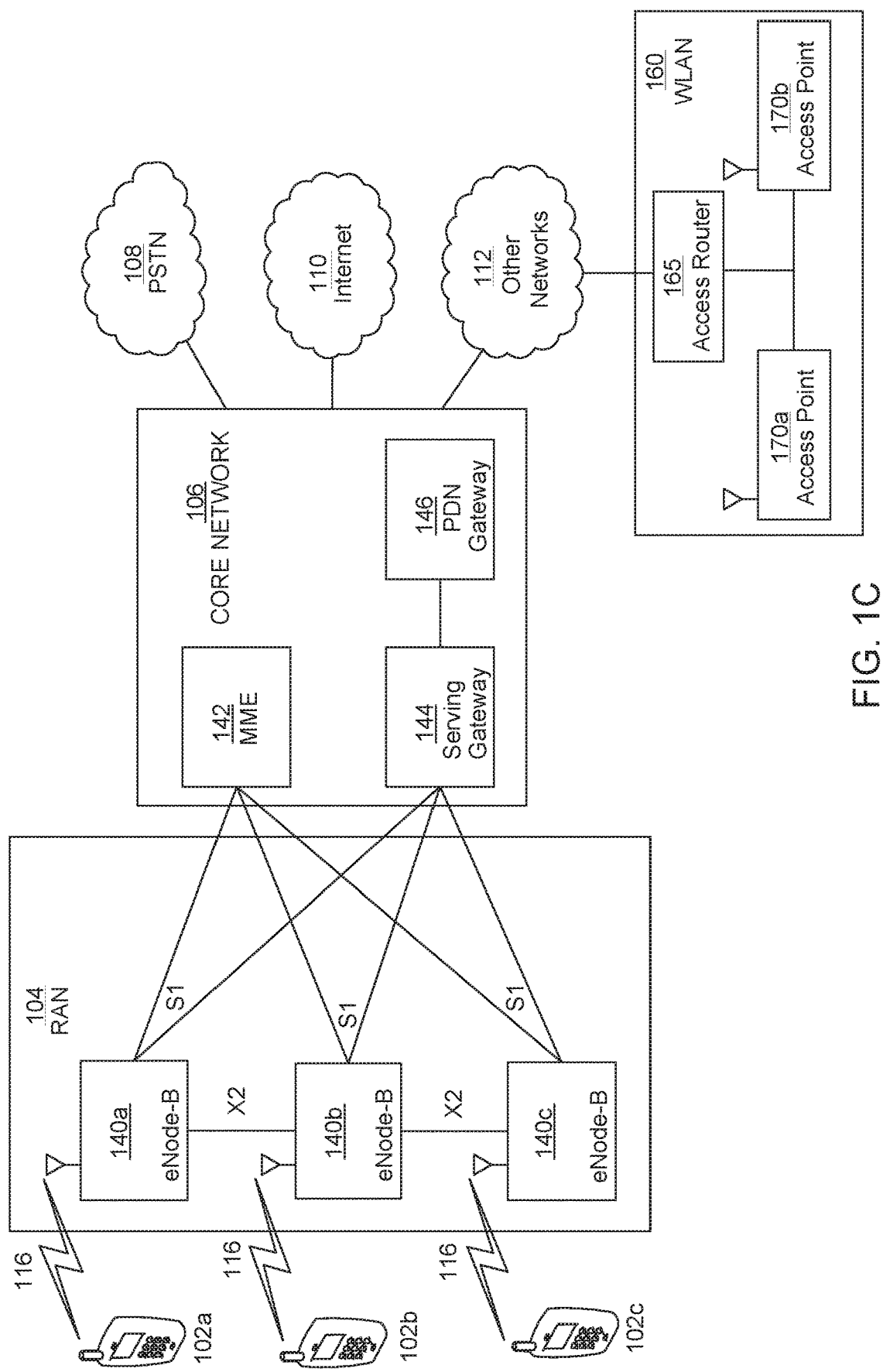
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

In FIG. 1A the example communications system 100 may be a 5G communication system with flexible radio access. The system 100 may have uses related to improved broadband performance (IBB), industrial control and communications (ICC) and vehicular applications (V2X), and massive Machine-Type Communications (mMTC) with requirements that may include, but are not limited to, ultra-low transmission latency, support for ultra-reliable transmission, support for MTC operation, and a plurality of spectrum operating modes (SOMs).

Support for ultra-low transmission latency may require support for time transmission intervals (TTIs) somewhere between 100 us and 250 us when operating with an air interface latency as low as 1 ms round-trip time (RTT). Support for ultra-low access latency, for example, the time from initial system access until the completion of the transmission of the first user plane data unit, may be of interest but may be of a lesser priority. ICC and V2X may require end-to-end (e2e) latency of less than 10 ms.

Support for ultra-reliable transmission may involve at least one design consideration: transmission reliability that is better than what is possible with legacy LTE systems including a target of 99.999% transmission success and service availability. For example IC and V2X scenarios may require a packet loss ratio of less than $10e^{-6}$. Another consideration may be support for mobility at speeds in the range of 0-500 km/h.

Support for MTC operation, including narrowband operation may also be desired where the air interface may efficiently support narrowband operation such as less than 200 KHz, extended battery life, such as up to 15 years of autonomy, and minimal communication overhead for small and infrequent data transmissions such as low data rates in the range of 1-100 kbps with an access latency between seconds and hours.

A plurality of spectrum operating modes (SOMs) may also be desirable in a wireless communication system. A WTRU 102 may be configured to perform transmissions according to one or more SOMs. For example, a SOM may correspond to transmissions that use at least one of the following: a specific TTI duration, a specific initial power level, a specific HARQ processing type, a specific upper bound for successful HARQ reception/transmission, a specific transmission mode, a specific physical channel for example, uplink or downlink, a specific waveform type or a transmission according to a specific RAT, for example, legacy LTE or according to a 5G transmission method. A SOM may correspond to a quality of service (QoS) level and/or be a related aspect, for example, a maximum/target latency, maximum/target block error rate (BLER) or the like. A SOM may correspond to a spectrum area and/or to a specific control channel or aspect thereof, for example, including a search space, DCI type, or the like.

Figure 2:
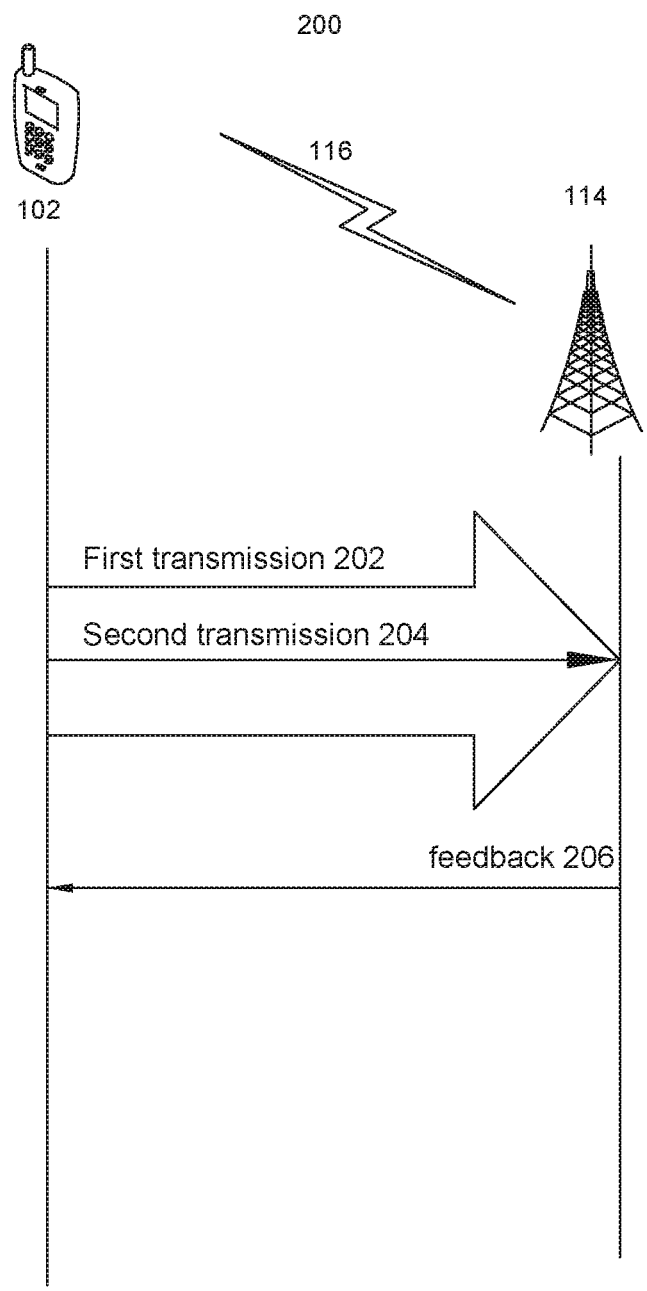
FIG. 2 is a diagram of an example process that may be used within the communication system illustrated in FIG. 1A.

FIG. 2 shows an example process based on a 5G communication system 200 where a first transmission 202 may be initiated, and wherein the first transmission 202 may be performed by using at least a portion of physical layer (PHY) resources where such resources may also correspond to at least a portion of PHY resources associated with a second transmission 204. The first transmission 202 may be referred to as a puncturing transmission, interfering transmission, delay-sensitive transmission, or short transmission. The second transmission 204 may be referred to as on-going transmission, or long transmission.

In the example process shown in FIG. 2 the first transmission 202 and second transmission 204 may be initiated and transmitted by the same entity, such as WTRU 102a, or different entities (not shown). The transmitting entity, or transmitter, may be a part of or associated with a network infrastructure node, a base station, or a WTRU. The first transmission 202 and second transmission 204 may be transferred over an air interface 116. The first transmission 202 and second transmission 204 may be received by, or intended for, the same entity such as base station 114, or different entities (not shown). The receiving entity, or receiver, may be a part of or associated with a network infrastructure node, a base station, or a WTRU. The first transmission 202 and second transmission 204 may be downlink transmissions, uplink transmissions, for example, as part of a cellular system, or a direct WTRU-to-WTRU transmission, for example, sidelink transmissions. In systems where hybrid automatic repeat request (HARQ) is used, feedback is transmitted 206 before and/or after the second transmission 204.

A WTRU 102 may determine to use any of the methods described herein as a function of any one or more of the SOMs associated with a transmission, for example a set or resources, carrier, subcarrier spacing, symbol duration, priority associated with specific data, TTI duration or the like, the PHY resources associated with the transmission, the control channel and/or one or more associated characteristic, for example, RNTI, location in terms of search space, CCE or the like associated with the transmission and/or PHY resources, received downlink control information, reference and/or demodulation signals associated with the transmission, a configuration received by upper layers, for example, a configured transmission mode, or the configuration associated with a specific HARQ process or one or more including a set of processes.

Systems and methods for robust PHY or MAC layer processing are disclosed herein. Processing at least one transport block (TB) at the PHY and/or MAC layer may be improved such that successful reception of the TB or data block may be possible even if the desired signal is replaced or interfered by another signal for a subset of resources within the TTI.

Figure 7A:
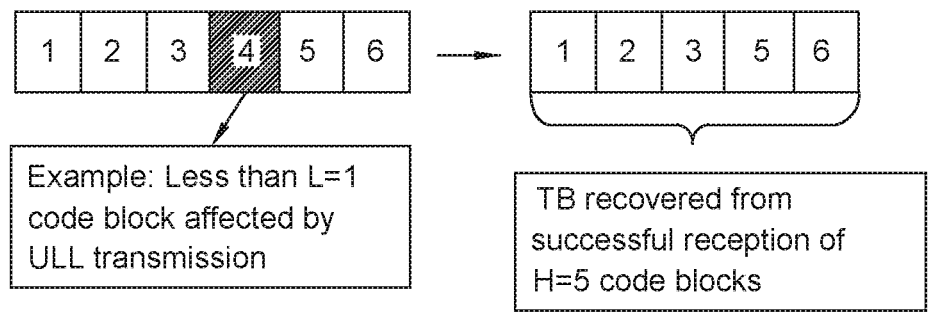
FIG. 7A illustrates an example of encoding where HARQ is applicable on a transport block basis.
Figure 7B:
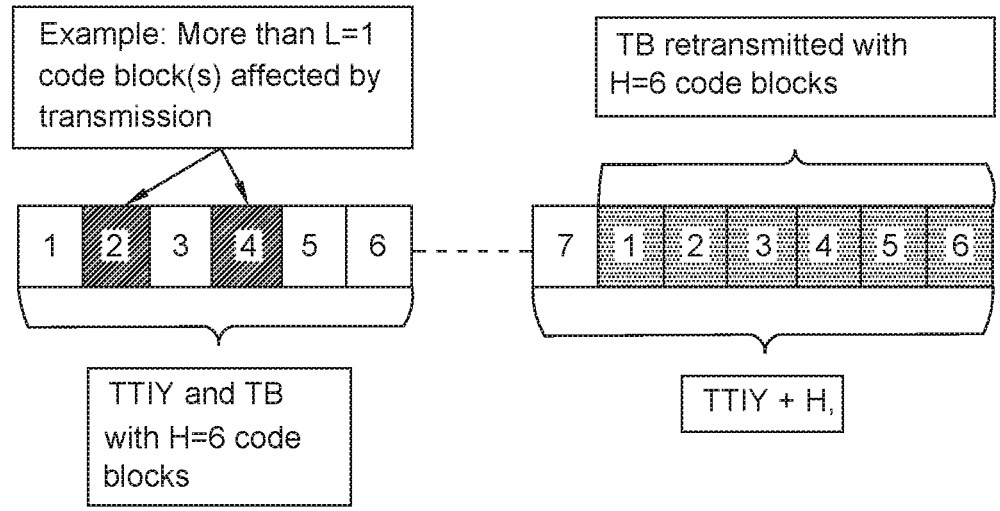
FIG. 7B illustrates an example of encoding where HARQ is applicable on a code block basis.

The processing may involve transmission of a TB or data block using multiple coded blocks of information, where error detection of each individual coded block may be supported. FIGS. 7A and 7B show examples of error detection and handling. The bits of a given coded block may be modulated into symbols mapped to resource elements in a subset of time symbols or time intervals. Interference or puncturing by another signal may thus affect only one or a few coded blocks of information, such that successful recovery of the TBs or data blocks may be possible, for example, without having to retransmit any of the information in the concerned transmission, or by retransmitting only a subset of the information in the concerned retransmission and/or by transmitting further coded blocks of information to complete the concerned transmission.

In some embodiments, physical or MAC layer processing may include an encoding stage at the transmitter side or decoding stage at the receiver side based on a code that has the property that K source symbols may be recovered with high probability from any K or more encoded symbols. Examples of codes that may satisfy this requirement include fountain codes, LT codes, or raptor codes. Without a loss of generality, the encoding stage is referred to as the fountain encoding stage or outer encoding stage in embodiments disclosed herein, but may include other types of encoding.

A source symbol may comprise any number of information bits. At the transmitter, it may be generated based on a block of bits at the output of a previous processing stage. For example, a source symbol may comprise bits of at least one block obtained from a segmentation stage at the transmitter. The bits of a fountain-encoded symbol at the output of the fountain encoding stage may in turn be used at the input of a further channel encoding stage which may be based on any forward error correcting (FEC) code such as a convolutional code, a turbo code, or a low-density-parity-check (LDPC) code. Such further channel encoding stage may also be referred to as an inner encoding stage.

Including a fountain-encoding or outer encoding stage may improve the robustness of a transmission such as the first transmission in FIG. 2. For example, the transmission may be more robust to a puncturing event or to an interfering transmission (such as the second transmission in FIG. 2). This is because an interfering transmission or a puncturing event may be of limited duration and may thus impair the ability of the receiver to successfully decode only a single, or a number less than the total number of, fountain-encoded blocks of bits for the transmission, for example as opposed to impairing the reception of the entire set of information bits for the transmission. This may be exploited in a number of ways. For example, the transmitter may transmit a few more fountain-encoded blocks of bits than what is necessary for successful decoding, such that the receiver may still decode a TB even if some fountain-encoded blocks were undecodable, for example, due to interference or puncturing. The transmitter may have initially generated the few more fountain-encoded blocks of bits or it may generate them once it determines more blocks are required. In another example, the receiver may request transmission of at least one additional fountain-encoded block of a TB or data block when it determines that not enough fountain-encoded blocks were received successfully to reconstruct the TB or data block. The at least one additional fountain-encoded block may be comprised of any fountain-encoded block(s) not already successfully received, and which do not need to be identical to a previously transmitted fountain-encoded block for which decoding failed.

Figure 3:
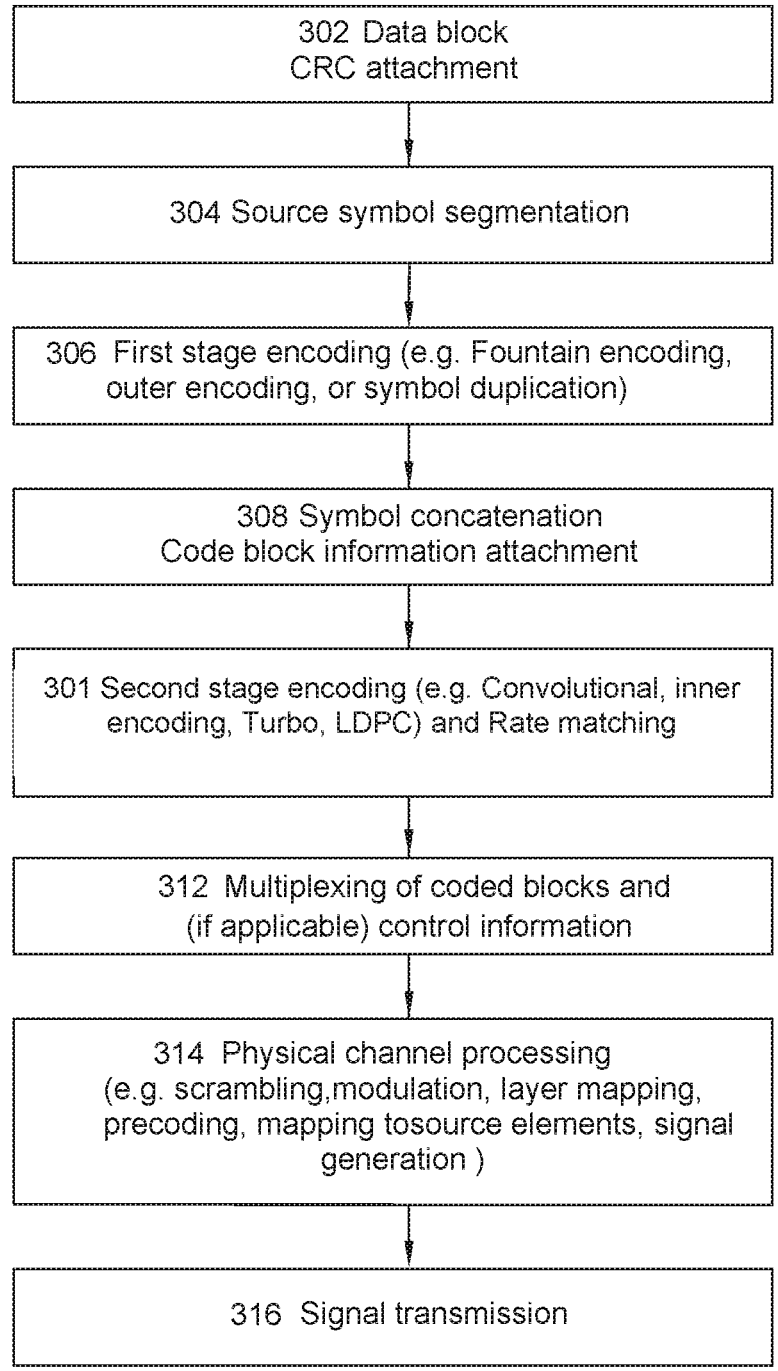
FIG. 3 illustrates an example process at a transmitter wherein all multiplexed coded blocks are from a single data block.

FIG. 3 illustrates an example process of a transmitter in a communication system 100. Specifically, the process of FIG. 3 illustrates an example where all multiplexed coded blocks for a signal transmission are from a single data block. At a transmitter side, a cyclic redundancy check (CRC) may first be attached 302 to a data block obtained from a higher layer, for example, a MAC layer, for the purpose of error detection for the data block. A "data block" may be comprised of a MAC PDU or TB in the case where the higher layer is MAC and fountain encoding is performed at the physical layer. Alternatively, fountain encoding may be performed at the MAC layer and/or in a new MAC sub-layer, in which case a "data block" may comprise an SDU of MAC or the new MAC sub-layer and possibly additional control information, for example, a MAC control element such as Power Headroom Report (PHR), Buffer Status Report (BSR) or the like.

The output may then be segmented in a number $K_t$ of source symbols at 304. Each source symbol may comprise a number of bits $T_b$, such as 612, 672, 1024, 2048 or 4096. In some embodiments, a number of padding bits may be appended to the last symbol so that its number of bits is $T_b$.

At 306 first stage encoding of the $K_t$ source symbol of $T_b$ bits may occur. In one embodiment, the first stage encoding is fountain encoding that may be applied on the $K_t$ symbols to provide $K_t+L_t$ fountain-encoded symbols or encoded symbols, where $L_t$ is a non-negative integer. Additional bits, hereto after referred to as symbol information or code block information, may be attached at 308, for example, appended or prepended to each fountain-encoded symbol or to each code block. Such symbol information may include at least a CRC and may be generated for different purposes, such as identification of the fountain-encoded symbols of the code block and/or of the corresponding data block, and error detection. The size of the code block information may be denoted as $N_{si}$. Each code block may comprise G symbols and $N_{si}$ code block information bits. The total number of code blocks is denoted by C, where C may be equal to the smallest integer larger than $(K_t+L_t)/G$ at least when fountain-encoding is applied. The number of code blocks containing together at least $K_t$ fountain-encoded symbols is denoted as K, and may correspond to a minimum number of blocks required for decoding a data block. The size of a code block may be equal to $G \times K_t + N_{si}$, except possibly for the last code block.

Alternatively, no fountain encoding may be applied on the K source blocks, or may be applied with a code rate of 1. In this case, after CRC attachment of the data block 302 segmentation into K code blocks 306 is performed, where K is a non-negative integer. Code block information may be attached at least in case K>1 and may include at least one of an identification of the code block, an identification of the data block, and CRC. A number C-K of code blocks may be duplicated from a subset or all of the original K code blocks to provide redundancy.

Transmitter operation in the example process of FIG. 3 may also include HARQ processing and FEC (or inner)

encoding. At 310, a second stage encoding or inner encoding may be performed using a FEC code such as convolutional, turbo, or LDPC code. Each of the C code blocks may be further encoded in the second stage encoding. In the case where fountain-encoding (or outer encoding) has not been applied previously, such encoding may not be referred to as "second-stage" (or inner) encoding. The type of FEC code used may depend on the size of each code block. Rate matching using a certain redundancy version (RV) may be performed over each of the C code blocks. The RV may be determined based on HARQ feedback received by the transmitter. The output of the second stage encoding and rate matching of a code block may be referred to herein as a "coded block".

In one or more embodiments, HARQ processing may be applicable on a data block basis. In this case, the same RV may be used for all code blocks and all C coded blocks may be multiplexed at 312 in a given transmission or TTI. For example, see FIG. 7A which shows an example where the TBs were successfully recovered for a HARQ performed on a transport block basis.

Alternatively, in some embodiments, HARQ processing may be applicable on a code block basis or fountain-encoded symbol basis. In this case, the transmitter may only encode a subset of C code blocks that were not already received successfully based on HARQ feedback. For example, see FIG. 7B which shows an example when HARQ is applicable on a code block basis: when some code blocks are lost more than L−1 threshold then the code blocks may have to be retransmitted. Alternatively, the transmitter may only transmit a number of code blocks equal or close to the number of code blocks that were not already received successfully based on HARQ feedback, for example, feedback indicating the number of missing code blocks for the concerned HARQ process. The C coded blocks, or subset thereof, may then be multiplexed at 312 in a TTI prior to further physical layer processing at 314. In one or more embodiments, coded blocks originating from different data blocks and/or rate-matched using different redundancy versions may be multiplexed in a TTI. In some embodiments, data blocks may be associated to different SOMs. Additional details for the selection of coded blocks as a function of feedback are described herein.

In some embodiments, some control information may be separately encoded and multiplexed at 312 with each coded block within the same physical channel. The control information may include, for example, information supporting HARQ operation, such as the RV associated with at least one code block, a HARQ process identity, a code block identity, or whether a specific code block contains new information or is a RV of a previously transmitted code block, for example, a new data indicator (NDI). Control information may further include information about the source symbol(s) or the fountain-encoded symbol(s) corresponding to the coded block. The control information may further include information supporting whether or not soft-combining may be applicable to the transmission and, if so, whether such processing should be performed for the entire transmission, for example, similar to legacy behavior, per data block, for example, in case where multiple data blocks may be included in the same transmission including different transport blocks, or per code block including possibly with a further indication of the applicable code block(s).

Alternatively or in combination, the control information may include an indication that the coded block has been pre-empted or punctured, in case the transmitter, and/or other elements or components, determines that the resources that would have been used for the transmission of the coded block are pre-empted by another transmission.

At 314, physical layer processing may further include at least one of scrambling, modulation and layer mapping, precoding, mapping to resource elements, and waveform generation. Thereafter or before, the signal is transmitted from a transmitter 316.

Figure 4:
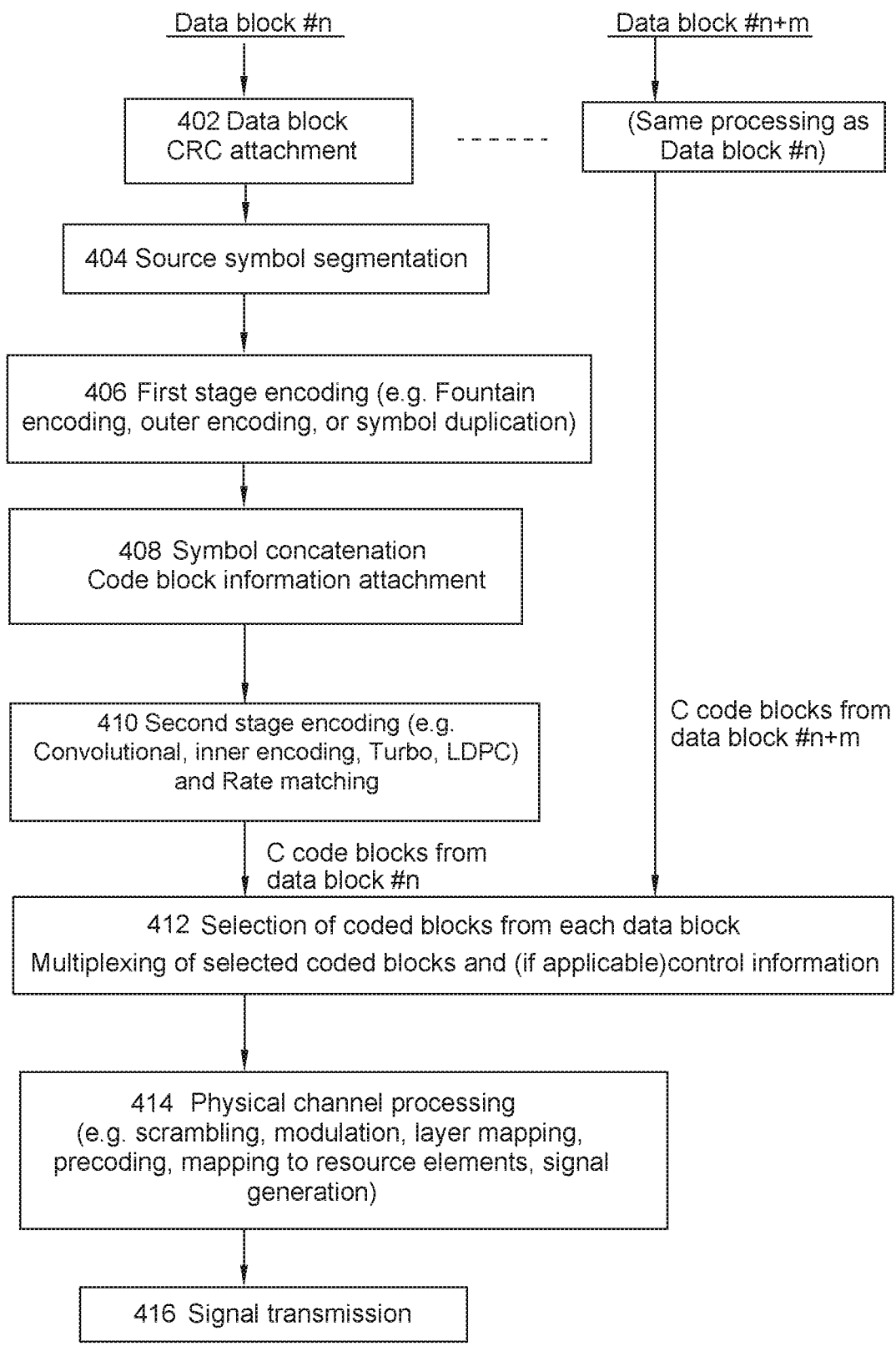
FIG. 4 illustrates an example process at a transmitter wherein coded blocks are multiplexed from multiple data blocks.

FIG. 4 shows an example process where coded blocks are multiplexed from multiple data blocks, as opposed from a single data block as in FIG. 3. Further, in FIG. 4, the code rate applicable to the second (or inner) stage encoding may be the same or may be different between the code blocks. For purposes of this disclosure, process and numbering described with regard to FIG. 3 will also be applicable to FIG. 4; for example, disclosures relating to 302 shall correlate to 402, and so on. Similarly, the process and numbering described with regard to FIG. 3 is also applicable to FIG. 5 to the extent that the processes align and or are related: for example, 302 shall correlate to 502.

Figure 5:
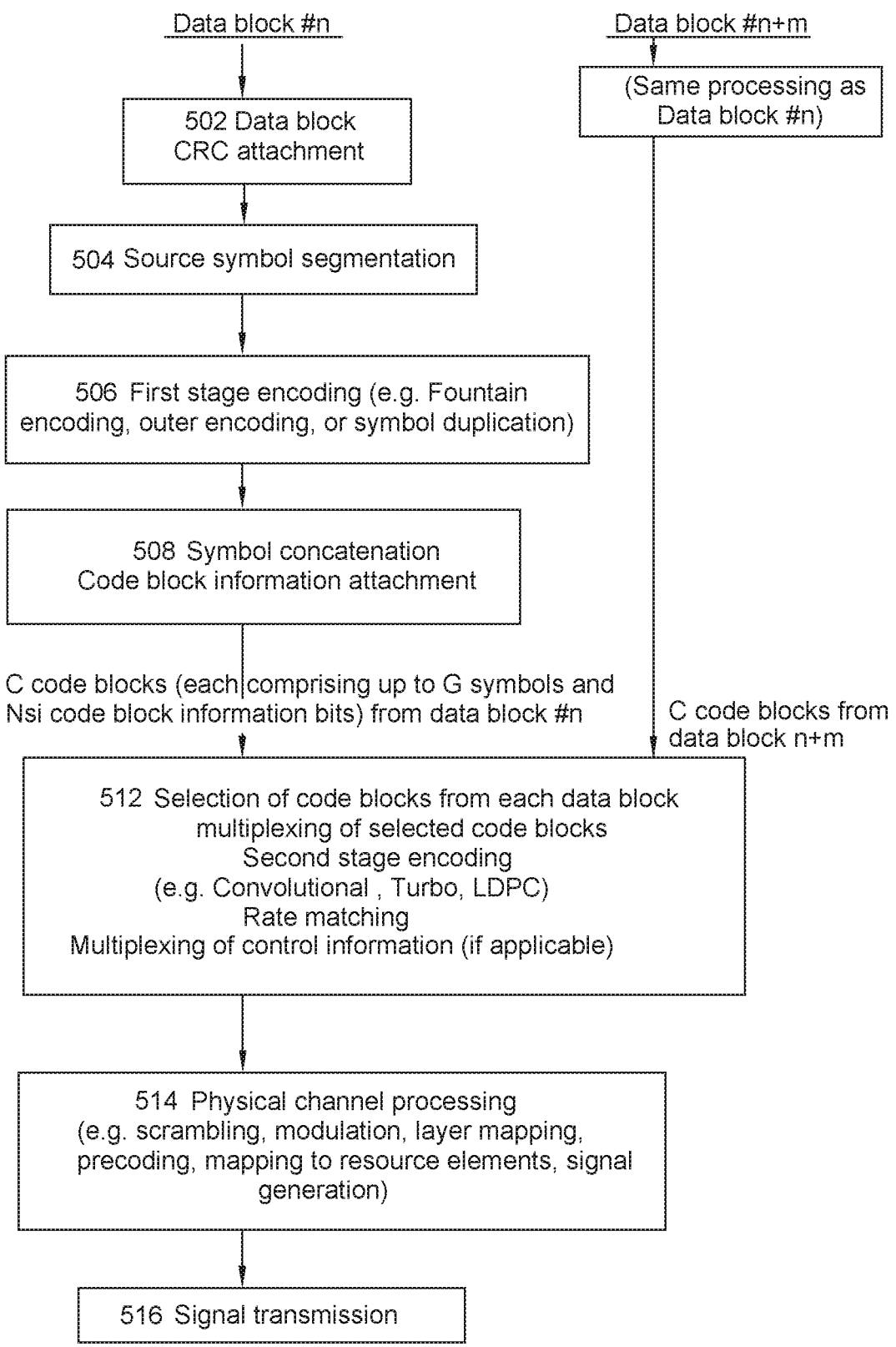
FIG. 5 illustrates an example process at a transmitter wherein coded blocks are multiplexed from multiple data blocks.

FIG. 5 shows an alternative example processing that may be applicable in the case where code blocks are multiplexed from multiple data blocks. In this alternative, code blocks selected from multiple data blocks may be multiplexed prior to second stage encoding.

In FIG. 4 and FIG. 5, the sizes of the multiple data blocks may be the same or may be different as denoted by data block #n or data block #n+m; in the examples illustrated in both figures the processes are similar until the selection of the coded blocks from each data block: see 412 in FIGS. 4 and 512 in FIG. 5.

The processing outlined and illustrated in FIGS. 2-5 may be modeled such that all processing may take place below the MAC layer, or alternatively such that some processing may take place at the MAC layer and others below the MAC layer, without limiting other realization of the principles described.

Figure 6:
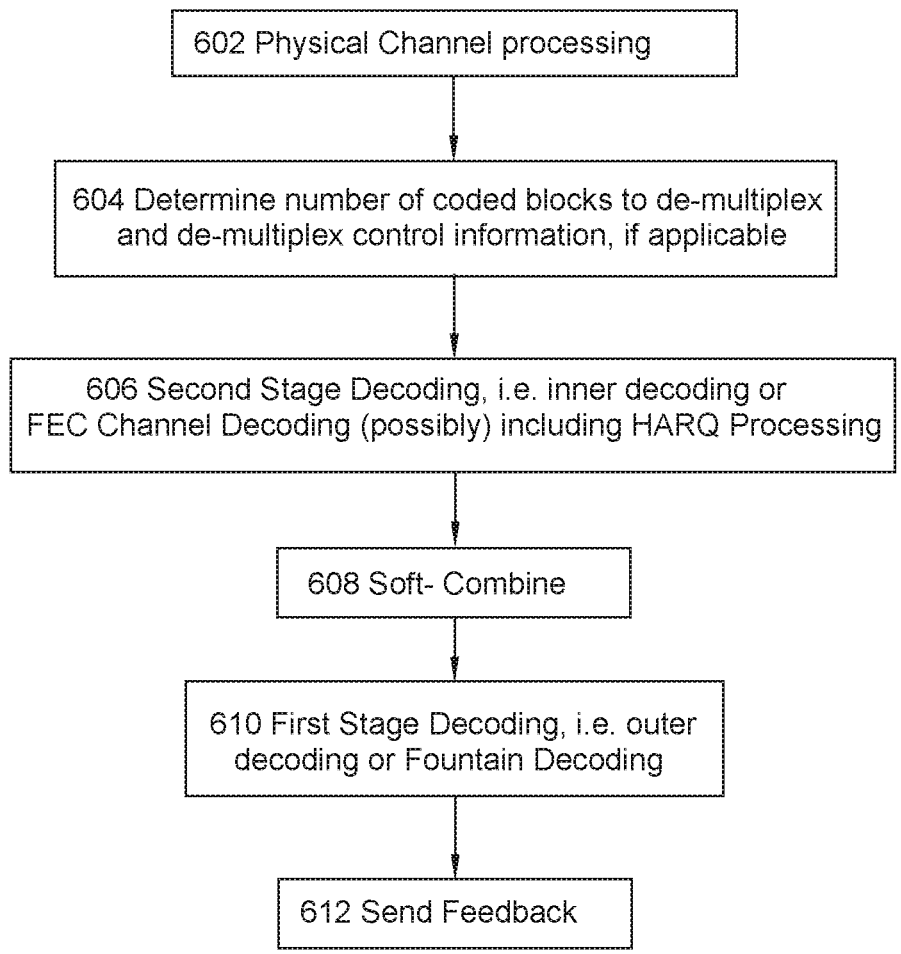
FIG. 6 illustrates an example process at a receiver wherein coded blocks are de-multiplexed.

In FIG. 6 an example process is shown at the receiver side, where corresponding operations may be performed in the reverse order from the transmit side. Initially, there is a physical channel processing 602 which includes, but is not limited to, demodulation, descrambling, and other reciprocal processes for the receipt of the transmitted signal from a process such as those in FIG. 3-5. Then at 604, the receiver may determine the number of coded blocks C to de-multiplex from a transmission and then de-multiplex that number of coded blocks C.

After de-multiplexing, demodulated data corresponding to each coded block may be decoded at a second stage decoding 606. Second stage decoding 606 may comprise taking the demodulated data corresponding to each coded block and inputting it to a FEC channel decoder, which may include inner decoding and/or HARQ processing as described herein. The receiver may determine a HARQ process, a code block identity, a RV and/or an NDI associated with a demodulated data block. The receiver may also determine that the demodulated data block should not undergo further processing and for example, should be discarded (not shown). This may happen, for example, if the receiver determines that significant interference has occurred for the demodulated data, or if the demodulated data does not carry any useful information for the receiver due to pre-emption, puncturing, or if a received WTRU identity does not match the WTRU identity for the receiver. Such a determination may be based on received control information or measurements performed on the resources from which the data was demodulated.

The demodulated data block may be (soft-)combined at 608 with previously received data blocks corresponding to the same code block and for which decoding was unsuccessful. The receiver may determine this based on the HARQ process applicable to the demodulated data block, and/or based on a code block identity applicable to the data block.

The receiver may determine the control information pertaining to the specific demodulated data block or to all demodulated data blocks of a TTI. The control information may be obtained from at least one of a physical control channel, de-multiplexing from the same physical channel as the coded blocks, the timing of the TTI and/or the location of the demodulated data block within a TTI or in the sequence of blocks, or a property of a reference signal used for demodulating the data block. The receiver may determine if the decoding for a coded block was successful based on a CRC included in the symbol information de-multiplexed from the symbol.

Receiver operation may use a first stage decoding, at 610 after control information was determined. In one embodiment, first stage decoding at 610 comprises fountain decoding or outer decoding as described herein. The receiver may obtain information about the contents of a successfully decoded block based on at least one of the symbol information de-multiplexed from symbol, the timing of the TTI and/or the location of the decoded block within a TTI or in the sequence of blocks, a property of a reference signal used for receiving the coded block, or control information received from a physical control channel or de-multiplexed from the same physical channel as the coded blocks.

If the use of fountain-encoding is configured, for example when fountain encoding may be applied at the transmitter, the receiver may attempt decoding of a data block based on a fountain decoder after any subset of at least K distinct code blocks, or of at least $K_t$ distinct fountain-encoded symbols generated from this data block, were successfully decoded. If fountain-encoding was not used for the transmission, the receiver may attempt decoding of a data block after all K original code blocks were successfully decoded. Based on the outcome of the different decoding, the receiver may provide feedback at 612 to the transmitter to request retransmissions.

A transmitter or a receiver, for example, a WTRU 102 of FIG. 2, may configure its processing such that it may determine the number, size and/or duration, for example, in transmission time, associated with one or more code blocks or coded blocks of information, hereafter described as blocks. The WTRU 102 may be further configured to determine a starting bit position of a block within the set of bits for the transmission and/or start time of a block within a TTI, in one embodiment, for each block or set of one or more thereof. Such processing may be part of HARQ processing.

As used herein, a parameter associated with the transmission may be understood as any parameter that may be pre-defined or explicitly or implicitly obtained from the physical layer or from higher layer signaling. For instance, a parameter may be obtained based on the value of a field received from downlink control information in a physical control channel or multiplexed in a physical data channel.

A transmission as discussed herein may carry data from H code blocks. Such a number may be a parameter associated with the transmission. The number may also be defined such that each code block occupies a certain amount of resources in the time, frequency or spatial domain. For instance, the number H of code blocks may be set such that each code block may occupy a certain number of resource blocks and/or a certain number of time symbols. The H code blocks may be generated from a single data block or from multiple data blocks.

A transmission as discussed herein may support a total number of coded bits $N_{cb2,tot}$ after the second encoding stage and prior to scrambling, modulation and other physical channel processing. The available number of coded bits may depend on the number of modulation symbols that may be mapped to resource elements of the transmission and the number of coded bits that may be mapped to a modulation symbol for a user. Such a number may correspond to the modulation order, or to a smaller number in the case where a multi-user superposition technique is employed. The number of modulation symbols may be a function of the number of resource elements and the layer mapping scheme, including a number of spatial layers (rank) and whether a spatial multiplexing, transmit diversity or another scheme is used. The number of resource elements may be a function of a resource allocation in time and/or frequency and may exclude resource elements used for transmission of other signals or channels. Any or all of the above may be parameters associated to the transmission. For example, a WTRU 102 may determine a total number of coded bits $N_{cb2,tot}$ for a specific transmission based on at least one field received in downlink control information. The at least one field may, for example, include at least one of a resource block assignment field, a field indicating a modulation order, a field indicating whether multi-user superposition is used and/or how to map coded bits to modulation symbols, a field indicating a number of layers, and/or a field indicating a set of time symbols including for example start and/or end symbols and the location of resource elements used for reference signals.

A transmission as discussed herein may support, for at least one code block h, a number of bits $N_{cb1,h}$ after the first encoding stage and prior to the second encoding stage. The total number of bits over the H code blocks prior to the second encoding stage may be referred to as $N_{cb1,tot}$. In some embodiments, for example in the case where the first encoding stage is performed at the MAC layer, the total number of bits prior to the second encoding stage may correspond to a transport block size (TBS). Alternatively, in some embodiments, for example in the case where the first encoding stage is performed at the physical layer, the data block size may correspond to a TBS.

At least in the case where the second encoding stage is independently applied to each code block, for example, as in the processing shown in FIG. 3 or FIG. 4, a number of coded bits $N_{cb2,h}$ is obtained for code block h after the second encoding stage 310 and 410, respectively. The sum of $N_{cb2,h}$ over code blocks h, added to the number of coded bits utilized for carrying control information, if applicable, may correspond to the total number of coded bits $N_{cb2,tot}$.

The code rate $R_{2,h}$ for the second encoding stage applied to code block h, may correspond to the ratio between $N_{cb1,h}$ and $N_{cb2,h}$.

In some embodiments, for at least one set of more than one code block the code rate $R_{2,h}$ applied to each code block may be determined to be the same over the set. In an embodiment, a unique code rate $R_2$ may be applied to all code blocks carried in the transmission regardless of the data block from which they are generated. In another embodiment, a same code rate $R_{2,hd}$ may be applied to all code blocks generated from a given data block d. In another embodiment, a same code rate $R_{2,new}$ may be applied to all code blocks that have not been transmitted in a previous TTI. In another embodiment, the code rate $R_{2,h}$ may be set independently for each code block such that the number of coded bits after the second stage $N_{cb2,h}$ is the same for all code blocks even if the number of coded bits prior to the second stage $N_{cb1,h}$ is not the same.

A transmission may carry data from at least one code block of $N_{cb1,h}$ bits which has been created and transmitted in a previous TTI as exemplified in FIG. 7B. Such code block(s) may be referred to as retransmitted block(s). In some embodiments, the number and values of coded bits $N_{cb2,h}$ and/or code blocks after the second encoding stage for a retransmitted block h is the same as used in the previous TTI for this code block. Alternatively, in some embodiments, the number of coded bits $N_{cb2,h}$ and/or code blocks may be determined based on a code rate $R_{2,h}$ different from the previous TTI, such as the example shown in FIG. 7B where TTI of Y retransmitted is TTI Y+H. The code rate $R_{2,h}$ may for instance be a code rate applicable to all code blocks of the transmission regardless of whether they are retransmitted blocks or not. Alternatively, the code rate $R_{2,h}$ may be such that the resulting number of coded bits after second stage $N_{cb2,h}$ is the same as the other blocks.

The WTRU 102 may determine a total number of bits prior to the second stage $N_{cb1,set}$ for a set of code blocks to which the same code rate $R_{2,set}$ is applied. In case more than one such set exists, for example, there are at least 2 code blocks to which different code rates $R_{2,h}$ are applied, the number of bits $N_{cb1,set}$ for each set may depend on the fraction of the resources of the transmission, for example, in terms of the number of coded bits $N_{cb2}$ used for each set. Such fraction(s) and/or resulting code rates may be parameter(s) associated with the transmission. In some solutions, the fraction and/or code rate may depend on the SOM, QoS, and/or type of bearer associated to the data block. Such fraction(s) and/or resulting code rates may be determined as a function of the order of the code block in a sequence and/or a set of physical resources used for mapping coded bits of the code block. This embodiment may be beneficial in case some sets of physical resources have lower or higher probabilities of being subject to interference and/or collision.

In case one of the sets comprises retransmitted blocks using the same coded bits as in the previous TTI, the fraction of resources of the transmission available to the other sets may be determined based on the difference between the total number of coded bits of the transmission $N_{cb2,tot}$ and the total number of coded bits $N_{cb2,retx}$ used by retransmitted blocks: $(N_{cb2,tot}-N_{cb2,retx})/N_{cb2,tot}$. In the case where the number of coded bits after second stage is set to be the same for all blocks, the fraction of resources may correspond to 1/H where H is the number of code blocks of the transmission.

The total number of bits prior to the second encoding stage $N_{cb1,set}$ for a set of code blocks may additionally be determined from the same parameters that may be used to determine the total number of coded bits $N_{cb2,tot}$ and an additional parameter applicable to the set indicating a code rate, such as modulation and coding scheme index. For example, the number of bits $N_{cb1,set}$ may be determined as a function of a modulation and coding scheme index, a number of allocated resource blocks, a number of spatial layers, and, if applicable, a fraction of coded bits applicable to the set. The determination may also take into account any control information to be multiplexed with the coded blocks after the second stage. The fraction of coded bits may be used to multiply the number of allocated resource blocks prior to using the function.

It may also be possible that the total number of bits prior to the second encoding stage $N_{cb1,set}$ for each set may first be determined, and that at least one parameter associated to the total number of coded bits be derived from this value. For example, the number of time symbols of the transmission may be determined such that $N_{cb1,set}$ may be accommodated in the transmission. Such an embodiment may be advantageous for transmission schemes allowing flexible transmission timing.

Generation of blocks in a first encoding stage is disclosed herein. In some solutions, at least one of the following quantities may be determined: a data block size (DBS) for data block d; a total number of fountain-encoded blocks (C) generated for data block d; a minimum number of blocks (K) required for decoding data block d; a number of blocks $H_d$ generated for data block d and included in a transmission; a number of additional fountain-encoded blocks (C-K) for data block d; a size prior to second encoding stage ($N_{cb1,h}$) for each block h generated from the data block d; a total size prior to second encoding stage $N_{cb1,setd}$ for the set of blocks generated from the data block d; a transmission power offset applicable to each or all of the code blocks generated for data block d for this transmission; and/or a total number of code blocks H in a transmission.

At least one of the above quantities may be parameters associated with the transmission, and others may be derived based on relationships described herein.

The data block size DBS may be related to the size of each code block prior to second encoding $N_{cb1,h}$ based on parameters disclosed herein. The size of a code block $N_{cb1,h}$ prior to second encoding may correspond to $G \times T_b + N_{si}$ bits.

A number of code blocks from a data block may be included in a transmission, such as those transmissions discussed herein. A number of blocks $H_d$ generated for a data block d may be included in a transmission. Such number may be smaller than the total number of code blocks of the transmission H in case code blocks from more than one data block may be included in the transmission. Otherwise, in the case where code blocks from a single data block is included in a transmission, the number of blocks $H_d$ may correspond to H.

In some embodiments, the number of blocks generated for the data block $H_d$ that are included in a transmission may correspond to the total number of fountain-encoded blocks C. The code rate may also be a parameter of the transmission. Such a configuration may be used, for instance, when multiplexing code blocks from more than one data block is not allowed and robustness to interference expected to be localized in time or frequency is desired. A code rate $R_1$ for the first encoding stage may be defined as the ratio K/C or equivalently $K/H_d$ or as the ratio between a number of source symbols $K_t$ and a total number of encoding symbol $K_t+L_t$. The data block size may be determined from the code rate $R_1$ and/or K, C, and the size of a code block $N_{cb1,h}$ taking into account the number of bits required for symbol information $N_{si}$ in each code block, and the number of CRC bits $N_{crc}$. The data block size may also be directly determined as a function of parameters such as a modulation and coding scheme index, a number of allocated resource blocks, a number of spatial layers, and/or, if applicable, a fraction of coded bits applicable to the set, given parameters K, C (and/or $R_1$) and a rule for determining how the size of each code block $N_{cb1,h}$ is a function of the total size $N_{cb1,setd}$, such as a rule that the code blocks may have the same size.

In some embodiments, the number of blocks generated for the data block $H_d$ that are included in a transmission may correspond to a minimum number of fountain-encoded blocks K. Such a configuration may typically be used, for instance, for the first transmission of a data block.

In some solutions, the number of blocks generated for the data block $H_d$ that are included in a transmission may be smaller than a minimum number of fountain-encoded blocks K. Such a configuration may typically be used, for instance, to provide additional blocks for the data block in the case where the number of successfully received code blocks in previous transmissions is or are insufficient. The configuration may also be used in a first transmission for a data block if the available resource in this transmission is not sufficient to accommodate a minimum number of blocks K.

A relationship may exist between the number of blocks, size of the blocks, and the total size for a set of blocks. The number of blocks $H_d$, for example, which may correspond to a value for K, and/or C-K and/or C may be determined as a function of the total size $N_{cb1,setd}$ and/or one or more block sizes $N_{cb1,h}$ associated with the transmission. Similarly, the total size $N_{cb1,setd}$ may be determined as a function of the number of blocks and the one or more block sizes $N_{cb1,h}$ associated with the transmission. Similarly, the one or more block sizes $N_{cb1,h}$ may be determined as a function of the total size $N_{cb1,setd}$ and the number of blocks associated with the transmission. Each such value may be determined by simple division using the smallest possible integer that enables transmission of all bits. In particular, the calculation may be performed when the block size $N_{cb1,h}$ is the same for all blocks in the transmission. Alternatively, each value may be determined using a table, for example, by a table lookup for the known values. In one example, a table lookup may be performed when different blocks have a different size for the same transmission.

In some solutions, the total size $N_{cb1,setd}$ may first be obtained based on parameters of the transmission as disclosed herein and the number of blocks $H_d$ and size of each block $N_{cb1,h}$ may be derived from it. The size of each block may be the same, except possibly the last one. A minimum $N_{cb1,min}$ and/or maximum value $N_{cb1,max}$ for the size of each block may be configured. A target number of blocks $H_{dt}$ may be configured. The number of blocks $H_d$ may be set to the target number of blocks $H_{dt}$ unless the resulting size of each block $N_{cb1,h}$ would be below the minimum $N_{cb1,min}$ or above the maximum $N_{cb1,max}$, in which case the number of blocks would be set to a smaller or larger value than $H_{dt}$, respectively, such that the size of each block remains within the allowed range.

Alternatively, the size of each block may be different from one another. In such an embodiment, the WTRU 102 may determine a sequence of block size for the transmission as parameters associated with the transmission, and use the corresponding values to determine the size of each block.

Alternatively, in some solutions, the number of blocks $H_d$ and the size of each block $N_{cb1,h}$ may first be determined, possibly as parameters associated with the transmission, and the number of bits $N_{cb1,set}$ may be determined based on the previous determination.

In one embodiment, code blocks from multiple data blocks may be allowed in a transmission. In the case where multiplexing of code blocks from multiple data blocks is allowed within a TTI, the data block size for a first data block that is transmitted for the first time in a TTI may also depend on the amount of resources utilized by the code blocks corresponding to a second data block that was generated in an earlier TTI. For example, if 20% of the resources of a TTI are utilized for the transmission of code blocks corresponding to the second data block that was generated in an earlier TTI, then the size for the first data block may need to be reduced. Assuming that code blocks are multiplexed in the time domain, this means that the data block size is also a function of the duration of the TTI available for the transmission of the data block.

In an exemplary embodiment, a determination of a number of blocks, block size(s), and code rate may be made. One or more of the number of blocks, the one or more block sizes, code rate, and the number of information bits may be determined according to at least one of an indication received in a DCI, a configuration from higher layers, a function of the total size of the information bits associated with the transmission, a function of one or more aspects associated with the SOM of the transmission, and/or a target duration for a code block.

An indication may be received in a DCI as disclosed herein. In one example, a WTRU 102 may receive a DCI that includes an indication relate to one or more such parameters. For example, the indication may include the number of information bits associated with the transmission. Such size may correspond to the TBS. For example, the indication may include the block size to use for the transmission. In another example, the indication may include and/or related to a sequence of block sizes. In yet another example, such indication may include whether or not fountain encoding is to be used and, if so, how it should be applied, for example, in terms of an amount of additional information bits to add. And in a final example, the indication may be an index to a configuration that include one or more of the above parameters.

In one embodiment a configuration may come from a higher layer and may relate to at least one a block size, a sequence of block sizes, whether or not fountain encoding is applicable, and/or TBS or DBS (for example, in cases of semi-persistent allocation or in case of fixed-size transmission). Also, some or all of the concerned information may be further dynamically signaled such that it overrides the concerned configuration aspect for the concerned transmission.

The number of information bits may be determined according to a function of the total size of the information bits associated with the transmission, for example, a TBS. In one embodiment, a WTRU 102 may determine the size of each block and use an integer number of blocks K that minimally fit all information bits. Fountain encoding may be applied such that L additional blocks are also added.

The number of information bits may be determined according to a function of one or more aspects associated with the SOM of the transmission, for example, a duration of the applicable TTI, physical layer resource, control channel associated with the transmission, the bandwidth of the transmission, or the like.

In another example, a target duration and/or bandwidth for a code block may be used. Specifically, the size of a code block may be set such that the time duration for the physical resources utilized for the transmission of the code block corresponds to a certain value. In such a case, the size of a code block may depend on the modulation and coding scheme as well as the amount of resources allocated in the frequency domain.

The presence of a non-zero value and/or a non-zero value for L may indicate that fountain encoding is applicable to the transmission. Such a transmission may correspond to the transmission of one TB.

In an exemplary embodiment, code blocks of a transmission may be from a single data block. A WTRU 102 may first determine a code rate $R_1$ for the first encoding stage, for example, a fountain-encoding stage of the data block. Such a data block may correspond to a transport block. A code rate may correspond to the ratio between a minimum number code blocks K and a total number of code blocks C for the data block, or to a number of source symbols $K_t$ and a total number of encoding symbol $K_t+L_t$. In some embodiments, the code rate $R_1$ may be determined from physical layer signaling, higher layer signaling, or from a combination thereof. For example, a field received in downlink control information may indicate one of a set of possible code rates configured by a radio resource control (RRC), such as {1, 9/10, 8/10, 7/10}. In some solutions, the minimum number of code blocks K and the total number of code blocks C may both be explicitly indicated using at least one field in downlink control information. In this case, the code rate may be obtained by taking the ratio between K and C. In another embodiment, the total number of code blocks C may be pre-defined or signaled by higher layers, while K may be indicated from downlink control information. In this embodiment, the total number of code blocks C for the data block corresponds to the total number of code blocks H of the transmission.

A WTRU 102 may then determine a DBS, which may correspond to a TBS, based on at least the code rate $R_1$ and other parameters provided by physical layer and/or higher layer signaling, such as an allocation in frequency and/or time domain (e.g. a number of resource blocks or a number of time symbols), an index representing a modulation and coding scheme where the coding scheme may describe a code rate for the second encoding stage, and/or a number of spatial layers used by the data block. The mapping may be obtained from pre-defined tables and/or formulas. For example, a data block size may be obtained from a table whose input is comprised of the code rate $R_1$, the available time and frequency resources expressed, for example, in terms of a number of resource elements or resource blocks and an indication of a modulation and coding scheme. In another example, the table may take as input an amount of available resources adjusted, for example, multiplied by the code rate $R_1$ and the indication of modulation and coding scheme.

Alternatively, a WTRU 102 may directly determine a data block size (DBS) based on legacy solutions and parameters, for example, not taking into account the additional code rate parameter $R_1$. In this case, it is assumed that the network would perform any needed adjustment of the modulation and coding scheme (MCS) parameter to compensate for the existence of the first stage encoding. The WTRU 102 may then use the code rate parameter $R_1$ and/or other parameters to derive the number of size of each code block.

The WTRU 102 may then determine a number of code blocks C and code block size $N_{cb1,h}$ for the $h^{th}$ code block. The number of code blocks may be determined from physical layer signaling, higher layer signaling, or a combination thereof. Alternatively, the number of code blocks may be determined such that after coding, modulation, and subsequent physical channel processing, modulated symbols generated from each code block are constrained within a certain number of time symbols and/or frequency resources. For example, a code block may be configured to occupy two consecutive time symbols and a maximum of 10 resource blocks, while the transmission may be configured to occupy 10 time symbols and 20 resource blocks. In this case, the number of code blocks may be determined to be C=10. The approximate code block size(s) including code block information $N_{cb1,h}$ may then be determined from the DBS, the code rate $R_1$ for the first stage encoding, the size of the attached CRC $N_{CRC}$, and the number of code blocks C. More specifically, an approximate code block size $N_{cb1,h}$ may be obtained as $N_{cb1,h}=(DBS+N_{CRC})/(R_1 \times C)$. In the example where C=10, in the case where the combined size of the data block and the attached CRC is 4896 bits and the code rate $R_1$ is 9/10, the approximate code block size $N_{cb1,h}$ may be 544 bits. The exact code block size for each block may be adjusted up or down from this value so as to fit one of a pre-defined set of sizes acceptable to the input of the second stage encoder. The number of code blocks and/or code block size may also be subject to lower and/or upper bounds. For example, the code block size may be constrained to be above a minimum threshold, for example 288 bits, to limit the overhead from code block information or ensure that at least one symbol can be accommodated, and/or to be below a maximum value, for example 6000 bits, acceptable to the second stage encoder. The code block size may also be constrained to be set to one of a set of pre-defined values such that an integer number of fountain-encoded symbols and the code block information can be accommodated in each code block. When the code block size is adjusted due to at least one of the disclosed constraints, the number of code blocks may be reset so that the combined size of all code blocks multiplied by the code rate $R_1$ matches or approximately matches DBS+$N_{CRC}$. In addition, one of the code blocks, such as the last one, may be set to a different or smaller size.

A WTRU 102 may then determine a number of source symbols $K_t$, a number of fountain-encoded symbols $K_t+L_t$, a maximum number of symbols per code block G and/or a symbol size $T_b$, based on the code rate R, the sizes of code blocks $N_{cb1,h}$ and/or the DBS. For example, the symbol size $T_b$ and number of symbols per code block G may be determined among a set of pre-defined combinations. For example, the symbol size may be set to a first value, for example, 612 bits, if the code block size is below a first threshold, a second value for example, 1024 bits, if the code block size is above the first threshold and below a second threshold, and so on. A similar solution can be used for the maximum number of symbols per code block G. The total number of fountain-encoded symbols $K_t+L_t$ may then be determined from the number of symbols in each code block and the size of the code block information $N_{ci}$. For example, in the case where the code block size $N_{cb1,h}$ is equal to 1056 for a number C of code blocks, a code rate R of 9/10 and $N_{ci}$ equal to 32, $T_b$ and G may be determined to be 612 and 2 respectively. The total number of fountain-encoded symbols may be 20, and the number of source symbols $K_t$ may be 18. In this example the DBS would be equal to 9192 bits if $N_{CRC}$ is 24.

Methods for multiplexing coded blocks in a TTI are disclosed herein. In one embodiment, a transmitter may multiplex coded blocks generated from a single data block in the same TTI and spatial layer, or alternatively in the same TTI but in multiple spatial layers. The transmitter may also multiplex any control information to be transmitted, if applicable. For example, the control information may be comprised of channel state information or HARQ-ACK information for an uplink transmission, or of HARQ-related information (redundancy version) for a downlink transmission.

In one or more additional embodiments, the transmitter may multiplex coded blocks generated from multiple data blocks in the same TTI and spatial layer, as well as applicable control information. For example, the transmitter may include at least one coded block generated from a first data block and at least one coded block from a second data block. The at least one coded block from the first data block may be comprised of one or more retransmissions for fountain-encoded symbols or source blocks, that were not successfully decoded in a previous TTI.

If multiplexing of coded blocks from multiple data blocks is employed, the transmitter may include coded blocks based on a specific order. For example, the order may be based first on the time when a first HARQ transmission occurred for a data block, fountain-encoded symbol or source block, then on the order of transmission of the fountain-encoded symbol or source block within its data block at the time of the initial transmission for this data block.

In some solutions, multiplexing of bits from different coded blocks may be performed in such a way that following modulation and mapping to physical resources, the information pertaining to a code block occupy resources that may be localized in time and/or frequency and/or a spatial/layer domain. This design increases the probability that the number of code blocks affected by interference and/or puncturing from another transmission is minimized, which increases the overall probability of successful decoding of the data block. For example, multiplexing may be performed such that information pertaining to a code block occupies all sub-carriers for a subset of consecutive time symbols, except possibly on the first and/or last time symbol, within the resources allocated to the transmission. This design may be realized by concatenating bits from the coded blocks and mapping modulation symbols in increasing order of sub-carrier first, time symbol second. This arrangement may be appropriate in cases of interference localized in the time domain, but not in the frequency domain.

In one embodiment, multiplexing may be performed such that information pertaining to a code block occupies all time symbols for a subset of consecutive sub-carriers (except possibly on the first and/or last subcarrier) within the resources allocated to the transmission. This design may be realized by concatenating bits from the coded blocks and mapping modulation symbols in increasing order of time symbol first, sub-carrier second. This arrangement may be advantageous in the case where interference is localized in the frequency domain, but not in time domain.

In another embodiment, multiplexing may be performed such that information pertaining to a code block occupies a subset of consecutive time symbols and a subset of consecutive sub-carriers, such that $H_t$ code blocks along the time domain occupy the time allocation, and $H_f$ code blocks along the frequency domain occupy the frequency allocation within the resources allocated to the transmission. This design may be realized by interleaving bits from $H_t$ sets of $H_f$ consecutive coded blocks such that $N_{sc}/H_f$ bits are successively taken from each of the $H_f$ blocks, where $N_{sc}$ is the number of subcarriers in the allocation, and concatenating the output from the $H_t$ sets, if modulation symbols are mapped in increasing order of sub-carrier first, time symbol second. Alternatively, this design may be realized by interleaving bits from $H_f$ sets of $H_t$ consecutive coded blocks such that $N_{ts}/H_t$ bits are successively taken from each of the $H_t$ blocks, where $N_{ts}$ is the number of time symbols in the allocation, and concatenating the output from the $H_f$ sets, if modulation symbols are mapped in increasing order of time symbol first, sub-carrier second. This arrangement may be advantageous in case of interference localized in both frequency and time domains. The number of code blocks C may be equal to $H_f \times H_t$.

The WTRU 102 may determine a multiplexing method and associated parameters, such as $H_f$ and/or $H_t$, based on pre-defined rules applicable to a specific transmission. In some solutions, the methods and parameters may be explicitly indicated from physical layer signaling and/or higher layer signaling applicable to the transmission, such as downlink control information. For example, one of a set of pre-defined parameter sets for $H_f$ and/or $H_t$ may be indicated in a field of downlink control information. In some solutions, the parameters $H_f$ and/or $H_t$ may be determined as a function of other parameters of the transmission. For example, there may be a maximum number of time symbols $J_{max}$ and/or a maximum number of sub-carriers or resource blocks $K_{max}$ for the resources occupied by a single code block. In this case the parameters $H_f$ or $H_t$ may be set to the smallest value such that a single code block occupies no more than $K_{max}$ sub-carriers or $J_{max}$ time symbols, respectively, given the resource allocation for the transmission. The parameters $J_{max}$ and $K_{max}$ may be pre-defined, configured by higher layers, or indicated by physical layer signaling. The parameters may be adjusted as a function of detected characteristics of interfering or puncturing signals, so as to minimize the probability that such interfering signal affects a large number of code blocks.

In some solutions, the order of the code blocks and/or the multiplexing methods may depend on at least one property associated to the code block. Similarly for example, the set of physical resources time, frequency, or spatial layer used for the code block may depend on the at least one property. In these solutions, a receiver, such as a WTRU 102, may infer at least one of the properties associated with a code block based on such order of the code block and/or set of physical resources used by the code block.

The at least one property associated with a code block may include at whether the code block is a retransmitted code block or is transmitted for the first time.

The at least one property associated with a code block may also include the order of the code block used in multiplexing for the last transmission containing this code block for a retransmitted code block; for example, the order may be the same as in the last transmission; in another example, this may be applicable to code blocks generated from a data block associated to a SOM corresponding to an ultra-reliable type of transmission.

The at least one property associated with a code block may also include the set of physical resources used by this code block in the last transmission containing the code block for a retransmitted code block; for example, the set of physical resources may be the same as in the last transmission.

The at least one property associated with a code block may also include an identity associated to the code block, such as a code block identity or an identity of the data block from which the code block is generated;

The at least one property associated with a code block may also include a redundancy version used for second encoding stage of the code block.

The at least one property associated with a code block may also include a retransmission sequence number.

The at least one property associated with a code block may also include a HARQ process identity.

The at least one property associated with a code block may also include a SOM, QoS, and/or a type of bearer associated to the data block.

The applicability of at least one of the disclosed multiplexing methods may depend on at least one parameter associated to the transmission. For example, downlink control information may indicate a set of retransmitted code blocks and/or corresponding order or sets of physical resources.

A receiver, such as but not limited to a WTRU or a network equipment, may report information to the transmitter, such as but not limited to a network equipment or a WTRU, on the success or failure of decoding of individual code blocks, or statistics thereof, and/or measurements, for the purpose of supporting proper adaptation of parameters such as: the total number of code blocks C; the code rate of the first stage of encoding R; the minimum number of code blocks for successful decoding of the transport data block K; and/or the maximum number of time symbols $J_{max}$ and maximum number of subcarriers $K_{max}$ for a code block.

Such reporting may be in addition to and potentially separate from HARQ reporting. The information may be comprised of the following items disclosed herein. The following information may be applicable only when the WTRU 102 receives a transmission and may be provided along with HARQ information as uplink control information: a number or fraction of successfully or unsuccessfully decoded code blocks for a specific data block or a specific transmission (the information may be provided only when indicated to do so from physical layer or higher layer signaling, and/or only when the data block is decoded successfully or not decoded successfully); an indication that at least F code blocks were not decoded successfully while the data block was decoded successfully; an indication that at least S code blocks were decoded successfully while the data block was not decoded successfully; a minimum/ maximum number of missing code blocks required for successful decoding of a specific data block; an indication that no code block was decoded successfully; and/or an indication, such as a flag, of whether the decoding outcome, success or failure, was the same for all code blocks or not.

In one embodiment information may be reported as physical layer signaling, along with, or as part of, channel state information or at higher layers, such as the RRC layer. Such information may include statistics of the events as described herein, applicable to a single transmission or multiple transmissions of data blocks, such as an average or a percentage of transmissions for which a condition is satisfied. In the same embodiment information may also include a recommended set of parameters applicable to coding and/or multiplexing of code blocks whose selection by the transmitter would result along with other channel state information parameters in meeting a certain performance requirement, such as 10% BLER. The parameters may include at least one of: a code rate R for the first encoding stage; a total number of code blocks C; a minimum number of code blocks K; and/or a number of code blocks along the time and/or frequency dimensions of the allocation ($H_t$ and/or $H_f$ respectively) or equivalently a number or fraction of time symbols and/or a number of fraction of sub-carriers occupied by symbols from each coded block.

In one embodiment measurements may be configured by higher layers and may be applicable to a configured reference resource, for example, a subframe or a set of subframes. The measurements may include a variance and/or maximum difference between the values of a certain metric measured over specified portions of the reference resource, wherein: the metric may consist of a noise or interference level or a signal-to-noise-plus-interference ratio (SINR); a portion of the reference resource may be defined as a contiguous subset of J time symbols and/or K subcarriers or resource blocks where J and K may be provided as part of the measurement configuration; and/or separate measurements may be reported for different partitions of the reference resource into portions (for example, different sets of values for J and K). The measurements may also include an indication of whether SINR or noise or interference level is uniform or not over the reference resource, for example, whether interference is white or colored over the resource) where the assessment may be based on whether the variance, potentially in dB, over portions of the reference resource exceeds a pre-defined or configured threshold, wherein separate indications may be reported for different partitions of the reference resource into portions, for example, different sets of values for J and K.

The WTRU 102 may initiate reporting of feedback based on a configuration aspects, for example, periodic reporting. The WTRU 102 may initiate reporting of such feedback following the reception of downlink control signaling that requests such feedback, for example, aperiodic reporting. The WTRU 102 may initiate reporting of such feedback when a potentially configurable threshold is met, for example, threshold-based reporting. In one solution, such a threshold may be based on any of the parameters disclosed herein subject to reporting. For example, a WTRU 102 may be configured to report HARQ ACK/NACK feedback as a function of the number of missing or unsuccessfully decoded blocks. For example, the number of missing block(s) may represent a threshold associated with a value that may be a configuration aspect of the WTRU 102. For example, a WTRU 102 may be configured to not report any HARQ feedback unless a number X1 code blocks are missing for proper decoding of a data block is below a value X2. For example, a WTRU 102 may be configured to report HARQ NACK feedback when a non-zero number X1 code blocks below a value X2 are missing for proper decoding of a data blocks, and HARQ ACK when X1 is equal to zero. For example, in one embodiment possibly extending the above, the WTRU 102 may be configured to report the minimum number of missing code blocks X1 when such is below a value X2. For example, this may be useful for the sender to determine when to adjust the number of code blocks included in a transmission such that transmission of unnecessary information may be reduced.

Similarly, a WTRU 102 that performs transmissions using block codes may take similar actions based on reception of HARQ feedback e.g. the WTRU 102 may adjust the number of code blocks in a transmission when it receives HARQ NACK feedback with the assumption that the number of missing blocks is less than a threshold X2. In one embodiment, such reporting may be configured per SOM and/or per HARQ process and/or for a specific set of HARQ processes, such as a set of HARQ process associated to a specific SOM. In another embodiment, the WTRU 102 may initiate such reporting when negative HARQ feedback is generated for a specific HARQ process.

The receiver may determine that it should generate, and transmit, HARQ feedback according to a method wherein the receiver may generate a positive HARQ acknowledgement (ACK) if it determines that it has successfully received at least K blocks for the associated process, for example, the HARQ process and/or the data block. In case where fountain encoding was used, the receiver may generate an ACK if fountain decoding was successful.

The receiver may determine that it should generate, and transmit, HARQ feedback according to a method wherein the receiver may generate a negative HARQ acknowledgement (NACK) if the receiver determines that it has successfully received less than K blocks for the associated process, such as the HARQ process and/or the data block, or that it cannot receive at least k blocks according to its current decoding state, or that no block was successfully received, or in case fountain decoding was not successful when applicable.

In an embodiment, the receiver may generate feedback only if it determines that HARQ processing, for example, including soft-combining, is applicable to the concerned transmission. In an embodiment, the receiver may generate such feedback for one or more impacted processes even if HARQ processing, for example, including soft-combining, is not applicable to the concerned transmission.

Block-related feedback (BRF) is disclosed herein. The receiver may generate BRF that indicates at least one of the following: the number of successfully decoded blocks for the concerned transmission, data block, process, or HARQ process (for example the identity of such blocks by using a bitmap); the number of decoded block(s) that is/are missing, such as the distance to K, such that the receiver may successfully decode the data block for the concerned transmission, data block, process, or HARQ process (for example the identity of the first missing or one or more missing blocks using a bitmap); and/or feedback may be generated only if the number of missing blocks, such as a distance to K, is less than a specific threshold, such as less than a specific ratio of the total number of blocks associated with the transmission, wherein the ratio and/or threshold may be a configuration aspect of the WTRU 102. Feedback may be transmitted using an uplink control channel dedicated to this effect or piggybacked on another type of uplink transmission.

Reception of feedback by a transmitter is disclosed herein. A transmitter may receive HARQ feedback. Such feedback may be received using applicable HARQ feedback transmission and reception methods. For example, feedback may be received on a downlink control channel. In an embodiment, feedback may be implicit from a DCI received that indicates a retransmission for a specific process. The WTRU 102 may determine to perform a retransmission for the concerned HARQ process upon reception of HARQ feedback including a negative acknowledgement.

In one or more embodiments, the transmitter may perform further transmission by selectively including specific blocks, for example, if the transmitter receives BRF for the concerned process and/or if control information is received that indicates such selective retransmission. In one embodiment, the transmitter may determine that more than K blocks have been generated for the information bits associated with the process. In this case, the transmitter may determine that such further transmission for the concerned process may include additional blocks that have not previously been transmitted.

The transmitter may receive BRF. BRF feedback may be received using applicable feedback transmission and reception methods or using control information of a dedicated channel or piggybacked with another transmission. For example, feedback may be received on a downlink control channel. Possibly, such feedback may be implicit from a DCI received that indicates a retransmission for one or more blocks associated with one or more specific processes. In this embodiment, the transmitter may determine a set of blocks to selectively transmit for one or more processes according to the received feedback and/or downlink control information. The transmission may be structured in a deterministic manner, for example, based on received control information such that the receiver may determine the set of blocks and the one or more applicable processes. Alternatively, the transmitter may include identities of the one or more applicable processes and/or information about the location of the blocks in the respective block sequence associated with the one or more applicable processes. In this case, the transmitter may determine what block to select from what process as a function of a priority, for example, a priority associated with each process, a time guarantee associated with a process, a SOM associated with a set of information bits, or other QoS parameters associated with either the process/transmission itself and/or with the data unit associated with the transmission process.

A 5G communication system design based on the methods and system described herein may efficiently support the transmission of data with different requirements in terms of latency, throughput and reliability. These requirements may correspondingly translate into different processing principles and transmission properties. For example, data associated with ultra-low latency and/or ultra-reliable use cases may be transmitted using a very short transmission time interval (TTI) with a modest amount of payload per TTI, while data associated with mobile broadband or massive MTC use cases be transmitted using a longer TTI to reduce control channel overhead.

Some data, such as data associated with ultra-low latency or ultra-reliable use cases may have to be transmitted with a very tight delay requirement from the time it is generated by the application layer. This requirement may be such that waiting until the end of an on-going transmission using a larger TTI would be unacceptable. Given that the delay-sensitive traffic is typically sporadic, reserving resources for exclusive use may be inefficient. Therefore, solutions allowing the transmission of delay-sensitive data in resources used for an on-going transmission, while maintaining robust performance for both transmissions, may be useful.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

What is claimed is:
1. A method implemented in a wireless transmit/receive unit (WTRU), the method comprising:
receiving a first transmission of a code block group, wherein one or more code blocks of the code block group is unsuccessfully decoded;
sending a bitmap with code block group feedback based on the one or more unsuccessfully decoded code blocks;
receiving control information, on a control channel, wherein the control information includes an indication that a code block group of a second transmission is a retransmission of the code block group from the first transmission; and
receiving the second transmission including the retransmission of the code block group from the first transmission.

2. The method of claim 1, wherein the control information further includes properties of the second transmission that identify the code block group of the second transmission.

3. The method of claim 2, wherein the properties of the second transmission include an indication that the code block group of the retransmission is combinable with the code block group of the first transmission, and wherein the first transmission is received prior to the second transmission.

4. A wireless transmit/receive unit (WTRU), the WTRU comprising:
    a transceiver operatively connected to a processor, the transceiver and processor configured to receive a first transmission of a code block group, wherein one or more code blocks of the code block group is unsuccessfully decoded;
    the transceiver and processor further configured to send a bitmap with code block group feedback based on the one or more unsuccessfully decoded code blocks; and
    the transceiver and processor further configured to receive control information on a control channel and receive a second transmission including a retransmission of the code block group from the first transmission, wherein the control information includes an indication that a code block group of the second transmission is the retransmission of the code block group from the first transmission.

5. The WTRU of claim 4, wherein the control information further includes properties of the second transmission that identify the code block of the second transmission.

6. The WTRU of claim 5, wherein the properties of the second transmission include an indication that the code block group of the retransmission is combinable with the code block group of the first transmission, and wherein the first transmission is received prior to the second transmission.

7. A method implemented by a base station, the method comprising:
    sending a first transmission of a code block group, wherein one or more code blocks of the code block group is unsuccessfully decoded;
    receiving feedback including a bitmap with code block group feedback based on the one or more unsuccessfully decoded code blocks;
    sending control information, on a control channel, wherein the control information includes an indication that a code block group of the second transmission is a retransmission of the code block group from the first transmission; and
    sending the second transmission including the retransmission of the code block group from the first transmission.

8. The method of claim 7, wherein the control information further includes properties of the second transmission that identify the code block group of the second transmission.

9. The method of claim 8, wherein the properties of the second transmission include an indication that the code block group of the retransmission is combinable with the code block group of the first transmission, and wherein the first transmission is transmitted prior to the second transmission.

10. A method implemented by a wireless transmit/receive unit (WTRU), the method comprising:
    receiving a first transmission with a plurality of sets of code blocks, wherein each set of code blocks comprises a plurality of code blocks, and wherein one or more code blocks of a first set of code blocks of the plurality of sets of code blocks is unsuccessfully decoded;
    sending a first transmission feedback bitmap based on the one or more unsuccessfully decoded code blocks, wherein each set of code blocks of the plurality of code blocks corresponds to a bit in the first transmission feedback bitmap; and
    receiving control information, wherein the control information includes an indication that a second transmission will include a retransmission of the first set of code blocks.

* * * * *